Aug. 3, 1965  R. C. PORTOUW  3,198,557
FLEXIBLE JOINT
Filed Feb. 9, 1962
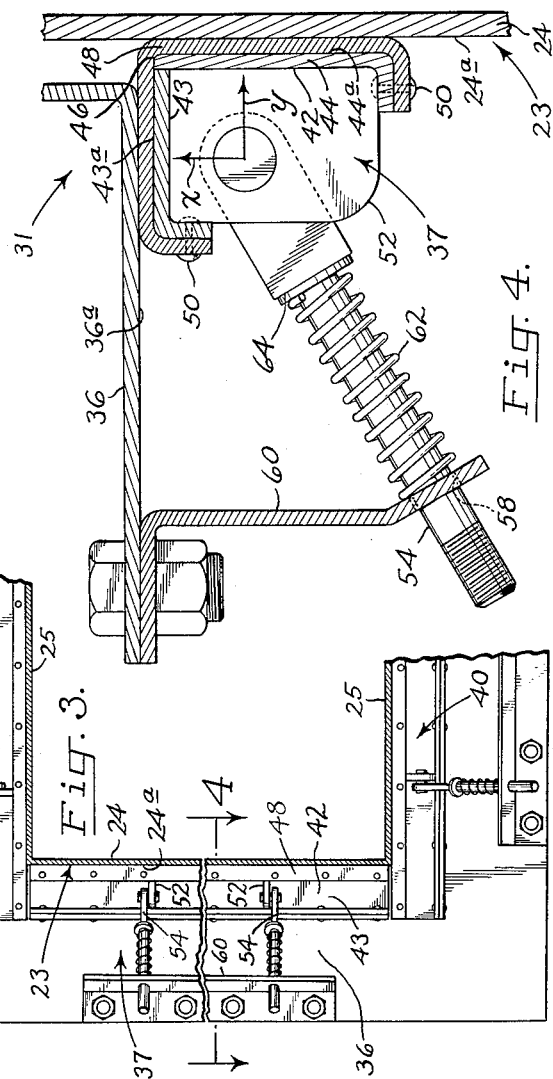
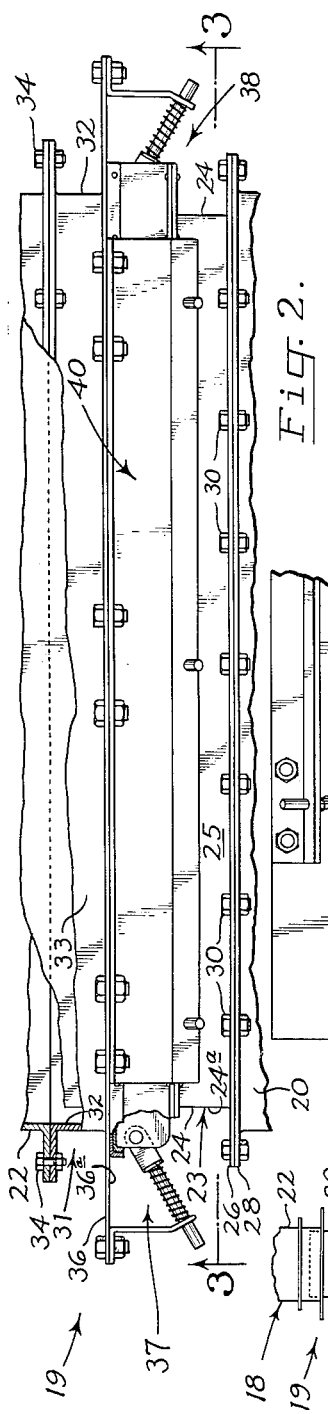
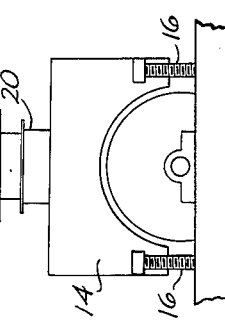
Robert C. Portouw
INVENTOR.
BY Ramsey, Kolisch & Hartwell
Attys.

3,198,557
FLEXIBLE JOINT
Robert C. Portouw, Portland, Oreg., assignor to Drew Engineering Company, Portland, Oreg., a corporation of Oregon
Filed Feb. 9, 1962, Ser. No. 172,325
2 Claims. (Cl. 285—224)

This invention concerns a flexible joint construction, and more particularly relates to a construction for a joint between a pair of parts, such as a pair of conduits, where the parts are sealed together and at the same time relative movement is afforded between the parts.

In certain types of fluid-handling operations, it is desirable to convey a fluid through a conduit or duct system, where such conduit or duct system includes sections that are movable relative to each other. A seal should be provided between the sections to inhibit leakage of fluid, i.e., provide a fluid-tight joint. Applications where the inclusion of such relatively movable duct sections is advantageous are in fluid-handling operations, where adjustability is a requirement in one end of a duct system, and fluid-handling operations where temperature variations produce elongation and contraction.

A general object of this invention is to provide an improved joint for a conduit or duct system, including a pair of relatively movable sections, that is simple, yet entirely practical and satisfactory in operation.

Another general object is to provide such a joint, where the joint accommodates relative movement between two conduit sections both in a longitudinal and in a transverse direction.

As contemplated by this invention, a pair of conduit sections or portions, with ends separated by a gap, are sealed together through the provision of plural sealing members or elements set end to end and encircling the gap. Each sealing element has one elongated surface portion that is in sealing engagement with part of one of the conduit sections, and another elongated surface portion occupying a plane disposed at an angle (normally at right angle) with respect to the plane occupied by the one surface portion that is in sealing engagement with part of the other conduit section. Bias means connected to each sealing element urges the surface portions of the element into proper sealing engagement, such bias means exerting a force on the element that includes a component normal to each of its surface portions. Should relative movement between the conduit sections occur, in either a longitudinal or in a transverse direction, such is accommodated by the sealing elements, with the elements shifting while still maintaining a tight seal.

Thus, another object of the invention is to provide a joint between two conduit sections, that includes a sealing element with sealing surfaces occupying planes disposed at angles with respect to each other, and means for urging the sealing surfaces of the element into proper sealing engagement, the latter means exerting forces normal to each of the sealing surfaces.

A further object is to provide a novel joint comprising plural sealing elements set end to end, and independently biased into sealing engagement.

Yet another object is to provide a novel flexible joint, which may be supported entirely by the two conduit sections it connects together.

Another object of the invention is to provide a joint that is easily repaired if need be, and easily maintained in proper operating condition.

These and other objects and advantages are attained by the invention, and the same is described hereinbelow in conjunction with the accompanying drawings, wherein:

FIG. 1 is a side elevation, somewhat simplified, of a conventional type of machine where the flexible joint of the invention may be used to an advantage;

FIG. 2 is a view illustrating in more detail, and on a somewhat larger scale and with portions broken away, portions of two conduit sections in a duct system connected by the joint of this invention;

FIG. 3 is a cross-sectional view, taken generally along the line 3—3 in FIG. 2, illustrating part of the joint; and FIG. 4 is a cross-sectional view, taken along the line 4—4 in FIG. 3, and on an even larger scale, illustrating a sealing element present in the joint and the mechanism provided for urging it into its proper sealing position.

Referring now to the drawings, and first of all to FIG. 1, part of a conventional machine is illustrated, in simplified form, where the flexible joint of this invention might be included. The machine, indicated generally at 10, may be a paper machine, and includes a rotatable roll 12 that paper material passes over during the manufacture of paper therefrom. A hood 14 is positioned over roll 12, and this may be shifted to various positions by means of an adjustable means 16, which in the embodiment illustrated takes the form of jack screws mounting the hood on top of the frame of the machine. The interior of hood 14 connects with a vertical duct system 18 extending upwardly therefrom, comprising aligned duct or conduit sections 20, 22. These are connected by a joint indicated at 19 in FIG. 1. During the manufacture of paper, hot gases travel through the hood and duct system. Duct 22 may be thought of as a fixed duct, and duct 20 as a movable duct, the latter being connected to hood 14, which may be raised, lowered, or tilted from side to side, through adjustment of means 16. Relative movement between the duct sections also may result because of temperature changes, and resulting elongation and contraction in the duct sections.

The machine thus far described is exemplary of the type of installation where the flexible joint of this invention may be employed advantageously. It is not intended by the description to be limited to the specific type of machine with which the joint is used, as it should be apparent that the construction has applicability to any number of conduit or duct systems, where relatively movable sections are present.

Reference is now made to FIGS. 2, 3, and 4, where there is illustrated, on a somewhat enlarged scale, and in more detail, joint 19 connecting relatively movable duct sections 20, 22.

As shown in these figures, at 23 there is indicated an extension or conduit portion secured to the top of lower duct section 20. The conduit portion has a rectangular outline, defined by opposed sides 24 and opposed sides 25. The conduit portion is secured to duct section 20, as by fastening a flange 26 thereof to a flange 28 of the duct section, with nut and bolt assemblies 30.

A similar extension or conduit portion 31 is secured to the base of top duct section 22, with nut and bolt assemblies 34. Like conduit portion 23, conduit portion 31 has a rectangular outline, defined by opposed sets of sides 32, 33. The dimensions of extension or conduit portion 31 are somewhat larger than the dimensions of extension or conduit portion 23, and lower (or inner) conduit portion 23 extends upwardly into the inside of the upper (or outer) conduit portion 31, with the two portions ordinarily substantially concentric and having parallel corresponding sides.

Joined to the bottom edge of conduit portion 31, and integral therewith, is a flange 36. Flange 36 extends completely about the conduit portion, with an elongated reach or expanse thereof paralleling each side. Each reach or expanse of the flange projects outwardly from the side of conduit portion 31 that it parallels, with the plane of its undersurface 36a substantially normal to the side. In the embodiment illustrated, flange 36 performs two functions. For one thing, its undersurface functions as a sealing surface in the construction. The flange also provides a means for supporting a series of sealing elements or members, shown at 37, 38, 40, and 41, and described more fully below.

Opposed sides 24 and opposed sides 25 of conduit portion 23 have outer surfaces that also function as sealing surfaces. This may best be explained by referring to the side 24 of conduit portion 23 shown in FIG. 4, and at the left of the drawings in FIGS. 2 and 3. As shown in these figures, the outer surface of side 24 is indicated at 24a. This outer surface constitutes a sealing surface in the construction cooperating with that portion of the undersurface of flange 36 that extends in an elongated reach adjacent side 24 in providing an elongated corner for receiving one of the sealing elements previously mentioned.

A sealed joint is provided between the outer surfaces of sides 24, 25 and the undersurface of flange 36 by sealing elements or members 37, 38, 40, and 41. The latter constitute sections of a sealing means encircling extension or conduit portion 23. Elements 37, 38 parallel and are opposite each other, and similarly, elements 40, 41 parallel and are opposite each other. The elements are disposed end to end, with the ends of elements 40, 41 overlapped with the ends of elements 37, 38.

The various sealing elements are similar in construction, and only one is described in detail.

Considering element or member 37 shown in FIGS. 2, 3, and 4, the element comprises an elongated, rigid mounting 42, having flanges 43, 44 disposed at right angles to each other. The outer surfaces 43a, 44a of flanges 43, 44 constitute elongated supporting surfaces joined along a corner 46 and extending in parallel reaches. Surface 43a occupies a plane that parallels the plane of the undersurface of flange 36, and surface 44a occupies a plane that parallels a side of extension or conduit portion 23.

A yieldable covering with portions extending over each of the supporting surfaces 43a, 44a is indicated at 48. The covering may comprise a layer of listing tape (asbestos) secured in place with fasteners 50. With the sealing element positioned as shown, that portion of covering 48 that covers flange 43 has an outer surface, constituting a sealing surface, in sealing contact with the undersurface of flange 36 directly thereover. That portion of covering 48 that covers flange 44 has an outer surface, constituting a sealing surface, in sealing contact with the outer surface of a side of extension 23 (surface 24a in the case of element 37).

As discussed earlier, flange 36 provides a means for supporting the sealing elements. Thus, and considering again sealing element 37, secured to mounting 42 adjacent its ends, and thus spaced along the length of the mounting, are plates 52 pivoted loosely on each plate 52 is a stud 54. Studs 54 have their nonpivoted ends extending loosely through bores 58 provided in a depending bracket 60 secured to flange 36.

As can be seen with reference to FIG. 4, studs 54 pivoted on the sealing element extend downwardly at acute angles relative to the planes of sealing surfaces 24a, 36a (and the planes of the sealing surfaces provided by covering 48). Encircling the studs, and also in this angular position, are coiled compression springs 62. One set of ends of springs 62 abut bracket 60, and the opposite set of ends of the springs abut washers bearing against shoulders 64 of the studs. The compression springs constitute a bias means interposed between the sealing element and one of the extensions or conduit portions (in this case conduit portion 31), urging the sealing element upwardly and to the right in FIG. 4, so that its sealing surfaces are in sealing engagement with surfaces 36a, 24a.

Referring again to FIG. 4, since the springs for element 37 are at an acute angle with respect to the sealing surfaces, they exert a force on element 37 that may be resolved into a component normal to surface 36a (indicated at X) and a component normal to surface 24a (indicated at Y). It has also been brought out that the studs are pivotally mounted on plates 52 and have their non-pivoted ends extending loosely through bores 58. As a consequence, each sealing element accommodates relative movement between the two extensions or conduit portions 23, 31, in a number of different directions, without loss of a sealed joint. For instance, in FIG. 4, extension or conduit portion 23 may be shifted upwardly or downwardly, with respect to conduit portion 31, and the springs are still operable to hold sealing element 37 in a proper sealing position. Conduit portion 23 may also be shifted to the left or right of conduit portion 31, or tilted relative to conduit portion 31, with the same result. In all the various positions, each sealing surface of the sealing element is forced against a complementary sealing surface presented by the two conduit portions 23, 31.

The overlapped ends of the sealing elements provide a relatively tight seal at the corners of the conduit portions. With reference to FIG. 3, element 37 may shift from left to right (laterally) freely in the space bounded by elements 40 and 41. With movement of elements 40, 41 upwardly (or downwardly) in FIG. 3, element 37 shifts longitudinally.

With other types of pipe, duct, or conduit constructions, some change in the construction of the sealing elements may be desirable. The particular biasing means used may also be subject to some variation. The biasing means selected, however, should exert a force on a sealing element that may be resolved into components normal to both of its sealing surfaces, and preferably each sealing element is biased independently of the other.

I claim:

1. A joint connecting two conduits comprising a first conduit portion with four sides and of rectangular outline integral with one of said conduits, another conduit portion with four sides integral with the other of said conduits substantially concentrically positioned with respect to said first conduit portion, flange means extending about one of said conduit portions including for each side of the other conduit portion an adjacent elongated surface portion set at an angle with respect to the side but extending in a reach paralleling the side, a sealing element interposed between each side of said first conduit portion and its adjacent surface portion of said flange means having a first elongated sealing surface engaging the side of the first conduit portion and a second elongated sealing surface engaging the adjacent surface portion of said flange means, and means resiliently holding each of said sealing elements in place.

2. A joint connecting two substantially axially aligned conduits together comprising a first conduit portion joined to one conduit and a second conduit portion joined to the other conduit, said second conduit portion having smaller outer dimensions than the first conduit portion and extending from a point outside to a point inside the first conduit portion whereby the two conduits are overlapped, a sealing surface for said first conduit portion encircling the conduit portion and occupying a plane substantially normal to the sides of the conduit portion, a sealing surface for said second conduit portion encircling the conduit portion at a point outside said first conduit portion and substantially paralleling the sides of the conduit portion, sealing means encircling said other conduit portion having first surface portions engaging the sealing surface of said first conduit portion and second surface portions engaging the sealing surface of said second conduit portion, and bias means interposed between one of said conduits and said sealing means urging the first and second surface portions of the sealing means against the sealing surfaces of said two conduit portions, said conduit portions having rectangular cross sections and being substantially concentric, said sealing means comprising a pair of opposed sealing elements substantially parallel with each other and two sets of sides of said conduit portions, and a second pair of opposed sealing elements substantially paralleling each other and another two sets of sides of said conduit portions and set at right angles to the first pair of sealing elements, one of said pair of sealing elements having ends overlapping the ends of the other said pair of sealing elements.

References Cited by the Examiner

UNITED STATES PATENTS

| | | | |
|---|---|---|---|
| 645,224 | 3/00 | Ostrom | 277—148 |
| 805,717 | 11/05 | Denegre | 277—143 |
| 1,053,638 | 2/13 | Ostrom | 20—68 |
| 1,282,290 | 10/18 | Rees | 28—68 |
| 2,473,710 | 6/49 | Jillson | 285—224 |
| 2,511,813 | 6/50 | Lockwood | 285—302 |
| 2,516,019 | 7/50 | Pierson | 285—302 |

CARL W. TOMLIN, *Primary Examiner.*